March 14, 1961 R. T. ADAMS ET AL 2,975,367

MAXIMUM SLOPE PULSE DETECTOR

Filed Jan. 10, 1957 3 Sheets-Sheet 1

Inventors
ROBERT T. ADAMS
JACK B. HARVEY
By [signature]
Attorney

Inventors
ROBERT T. ADAMS
JACK B. HARVEY
By Percy P. Lantzy
Attorney

Inventors
ROBERT T. ADAMS
JACK B. HARVEY
By Percy P. Lantzy
Attorney

United States Patent Office 2,975,367

Patented Mar. 14, 1961

2,975,367

MAXIMUM SLOPE PULSE DETECTOR

Robert T. Adams, Short Hills, N.J., and Jack B. Harvey, New York, N.Y., assignors to International Telephone and Telegraph Corporation, Nutley, N.J., a corporation of Maryland Filed Jan. 10, 1957, Ser. No. 633,442

8 Claims. (Cl. 328—114)

This invention relates to pulse detector circuits and in more particular to circuit means for automatically developing a signal pulse at the point of maximum slope of an input pulse signal so that noise accompanying the pulse signal has a minimum effect in producing distortion in the demodulation process.

In communication systems, particularly pulse communication systems such as pulse time modulation, it is desirable to transmit pulse signals having a minimum amount of noise, or in other words a signal having the maximum signal to noise ratio. In pulse time modulation systems intelligence is normally transmitted by pulses of constant amplitude and duration, where the instantaneous amplitude of the voice signals are translated into variations of time intervals between successive pulses or of the time position of pulses. The rate of this variation corresponds to the instantaneous frequency of the signal. In other words, a particular value or sample of the modulating signal is represented by the displacement of the pulse in time with respect to a synchronizing pulse or time reference and the frequency of the modulating signal is given by the rate of change of pulse displacement. Transmissions of this type are normally accompanied by impulse and thermal noise. The former is normally caused by electrical disturbances generated externally or by neighboring systems and the latter caused by the primary stages of the receiving system. In pulse time modulation systems where transmitted intelligence is derived from the timing of a pulse edge, noise may displace the pulse edge from the value corresponding to the modulating signal. Noise impulses in effect may modulate other characteristics of the signal pulse such as amplitude, width and slope of the pulse edges, but the ultimate result is translated into a pulse time displacement, producing a distorted intelligence signal. There are many types of noise pulses, which run the gamut of all shapes and variations in time consistent with the bandwidth of the receiver, which might be imagined. As far as their interfering effects are concerned, only those noise pulses that actually coincide in time with the signal pulse edge will cause audio frequency noise output. The distorted pulse may effectively be regarded as a new pulse whose sloping leading edge is raised or lowered by an amount varying with the position of noise pulsations, where the value of this displacement is proportional to the ratio of noise amplitude to pulse amplitude. This displacement of the leading edge is converted by the demodulation process into time displacement and therefore audible noise. In other words, any noise small enough in amplitude to be eliminated by the limiter will nevertheless generate an audible noise at the output of the demodulator through time displacement of the pulse edge selected by the demodulator.

To reduce the pulse front time displacement to a minimum, resulting from spurious and thermal noise, it is desirable to select the steepest portion of the pulse leading edge since it is at that portion of the pulse front where the least noise effects are found, and additionally, it is desirable to select a characteristic point of the pulse, such as the steepest slope, which can be identified regardless of any variable added noise amplitude, and whose timing is also independent of signal amplitude fluctuations. The point of maximum slope is completely independent of noise pulse amplitude and least sensitive to noise pulse slope and curvature, so that if a noise pulse were formed at the point of time where the original pulse had its maximum slope, the time displacement normally resulting from noise would be reduced to a bare minimum. This new pulse properly amplified and shaped would then replace the original transmitted pulse, containing the initial intelligence, and when applied to the appropriate receiver for recovering the original intelligence signal, the noise accompanying the original input pulse signal will have minimum effect in producing distortion in the demodulation process. It may be appreciated that although a time displacement is effected by the formation of a new pulse at the point of maximum slope of the initial pulse, with respect to its leading edge, nevertheless this time displacement represents a constant, for any signal pulse shape so that the reproduced intelligence signal merely undergoes a constant small delay, but no impairment in fidelity or distortionless reproduction.

It is therefore one object of this invention to provide an improved demodulation system for a pulse time modulated signal.

Another object of this invention is to provide circuitry for determining the point of maximum slope of an input signal pulse.

A still further object is the generation of an output signal pulse at the point of maximum slope of the input pulse and reshaping the pulse so produced independently of the pulse amplitude.

A feature of this invention is the providing of a system for automatically selecting the point of maximum slope of an input signal pulse by first differentiating the input signal pulse to produce a pulse having its peak amplitude at the point of maximum slope, clipping negatively the unwanted part of the differentiated signal, and differentiating again so that the crossover at the base line or tail of the second differentiated pulse corresponds to the peak of the pulse formed by the first differentiation of the input signal pulse or the point of maximum slope of the input signal pulse. The resulting signal is then clipped positively to produce a negative signal whose leading edge represents in time the point of maximum slope of the original input pulse signal. This signal is then amplified, and limited, to produce a steep wave point which in time triggers a pulse forming, or reshaping circuit, to produce a pulse having a wave point coinciding with the point of maximum slope of the original input signal pulse, and of a duration within the confines of the pulse repetition rate of the system.

The above-mentioned and other features and objects of this invention will become more apparent by reference to the following description taken in conjunction with the accompanying drawings, in which.

Figure 1:
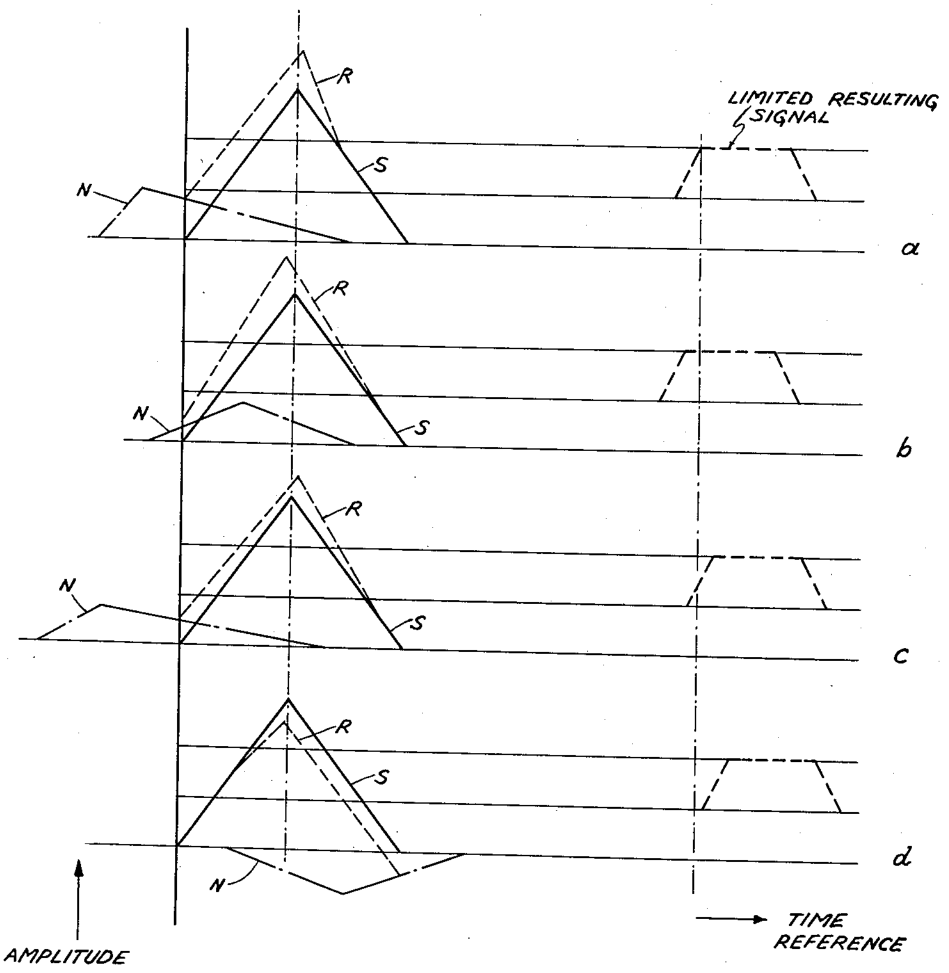
Fig. 1 is a graphic illustration of the time displacement of the leading edge of a signal resulting from noise.

Referring to Fig. 1, it can be seen that a system which transmits a pulse signal in accordance with intelligence imparted to it, is susceptible to faulty reception at the receiver because of the inherent noise limitation as depicted in curves *a*, *b*, *c*, and *d*. The signal pulse S and noise pulse N, within the restricted bandwidth, are combined as an additive function so that there results a signal R which is displaced in time, either lagging or leading the original signal, the original signal thus being a time modulated signal not in accordance with intelligence, but rather in accordance with noise. This effect is readily discernible from Fig. 1 when after appropriate limiting the resultant noise modulated signal shows a pronounced time displacement from the original signal in the absence of noise.

Figure 2:
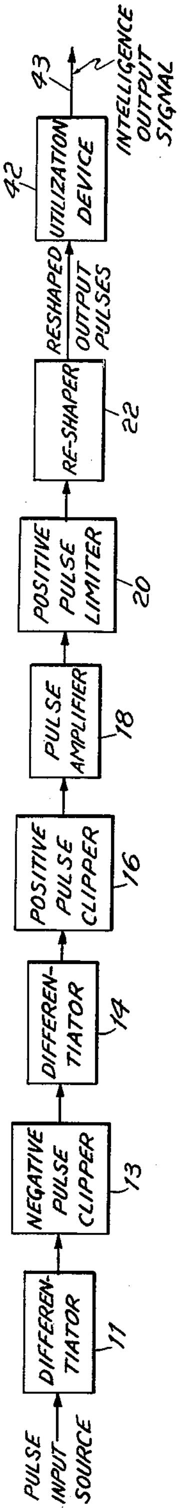
Fig. 2 is a block diagram in accordance with this invention, showing a system for producing a signal pulse output having minimum time modulation due to the presence of noise.

Fig. 2 shows in block form the various component parts which go to make up the circuitry necessary for producing an output pulse signal having minimum time displacement resulting from noise modulated input pulse signals. An input signal pulse 10, having low inclined slopes by reason of the restricted bandwidth inherent in pulse modulation systems, is first differentiated by differentiating circuit 11, the output resulting in a double peaked wave 12 whose positive peak occurs at a time coinciding with the time at which the maximum slope of wave 10 occurs. This is verified by merely taking the slope M as equal to the $de/dt$ where $(e)$ is the signal amplitude and $(t)$ the time variable of the signal wave. The differential $de/dt$ is a maximum at the point of maximum slope M, and occurs at P on the wave 12. The differentiated wave 12 of input pulse 10 has both positive and negative peaks. The negative peak is subsequently clipped by clipper circuit 13 so that only the positive peaked wave 13*a* appears at the output of clipper. The signal represented by waveform 13*a* is then differentiated by differentiating circuit 14 to again produce a double peaked wave 15. The peak P of wave 13*a* now becomes the base portion of wave 15 at the point where the wave 15 undergoes a transition from positive to negative. The wave 15 has its positive peak clipped by clipper circuit 16 to produce an electric signal having a negative peaked wave whose leading edge or start position coincides with P, the point in time where the maximum slope occurred for input pulse 10. The signal represented by this wave form is then amplified in pulse amplifier 18 to produce a steep wavefront signal 19 thus insuring a very fast rise time at the point P. The amplified pulse signal 19 is then limited in amplitude by a positive pulse limiter circuit 20, assuring the utilization of only that portion of the wavefront of pulse 19 having the steepest slope. The resulting output pulse 21 having the steep wavefront is thus least sensitive to changes in amplitude of the input signal 19. Finally the output pulse 21 having a steep wavefront is utilized, as to its wavefront, to trigger or otherwise synchronize a reshaping circuit 22 to produce a system output pulse signal 23 having its vertical leading edge coinciding in time with the point of maximum slope of the input signal pulse 10 and its trailing edge sufficiently spaced in time from its leading edge to meet the bandwidth and pulse repetition rate of the system. As originally stated, the signal input pulse 10 has sloping sides by reason of the bandwidth restriction requirements to limit the noise factors. To reproduce the original intelligence it is necessary to properly reproduce the original sampling pulses in proper time sequences, and this can only be accomplished by properly reshaping the timing pulse for proper introduction into the receiver, thus assuring proper intelligence with a minimum of noise and distortion.

Figure 3:
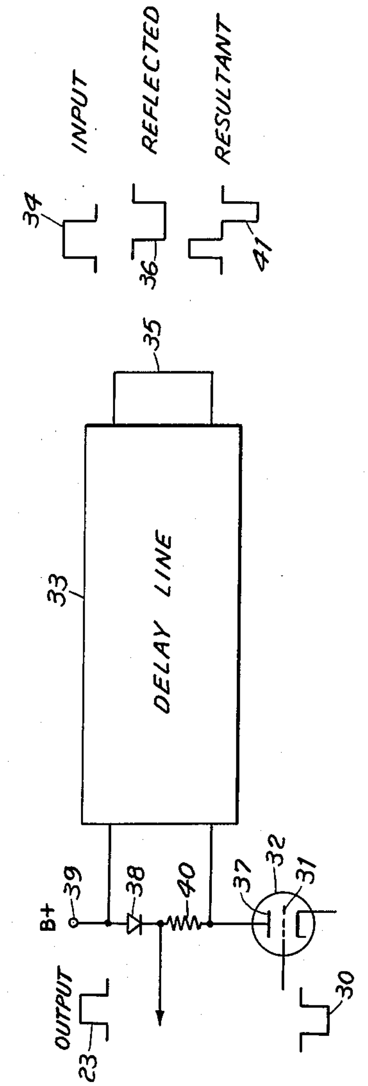
Fig. 3 is a pulse reshaper circuit, using a delay line, usable in the invention herein.

Referring to Fig. 3, there is shown a novel type of reshaping circuit disclosed by Robert L. Plouffe, Jr. in pending application filed September 12, 1956, Serial No. 609,373, Patent No. 2,820,909, which we prefer for reshaper 22. In operation a negative going pulse 30 is coupled to grid 31 of tube 32 which results in a positive pulse being applied to the input of delay line 33 as illustrated by pulse 34. The pulse 34 travels down the delay line to the short circuit 35 and is reflected therefrom with negative polarity, as illustrated by pulse 36. The reflected pulse 36 would then appear at the output circuit connected to the anode 37 in conjunction with the input pulse 34. Because of the connection of diode 38 and the polarity of input pulse 34, diode 38 is non-conducting, and thus the input end of delay line 33 is effectively an open circuit. The direct current path to the anode supply voltage, connected to the supply terminal 39, is through the delay line. The resultant negative reflected pulse 36 due to its polarity, and the connection of diode 38, acts to switch the diode to conduction, and thus the input end of delay line 1 is terminated in the characteristic impedance of a delay line, the value of resistor 40 and the small forward conduction resistance of diode 38. The input pulse 34 and the reflected pulse 36 are combined in the anode circuit of tube 32 to provide the resultant pulse 41 which includes a narrowed positive pulse and a narrowed negative pulse, the width of these pulses being dependent upon the time delay of delay line 33. The resultant pulse 41 has its negative position clipped by the diode 40 so that the final output pulse 23 results. The output pulse 23 has its leading edge essentially squared and commencing in time at the point of maximum slope of the initial pulse signal 10. The output pulse 23 has a width which varies with the delay of delay line 1. Although a single species of pulse reshaping circuitry has been provided, other forms of circuitry which have for their function the reshaping of coupled input pulses to produce essentially output pulses having vertical skirts can be utilized in the invention herein.

The output pulses 23 after having been appropriately reshaped, are coupled to a utilization device 42 such as a demodulator and the like to recover the original intelligence signal 43 transmitted.

Figure 4:
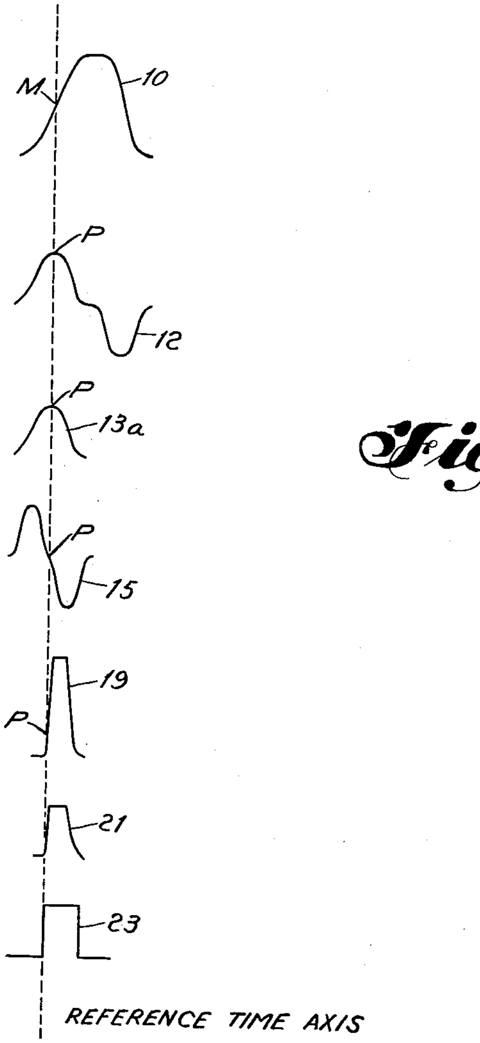
Fig. 4 is a waveform diagram showing the output waveform of the component parts of the system and their relationship with respect to a reference time or point of maximum slope.

In summary and referring to Fig. 4, the various signal waves are produced by the component members of the system, using as a reference line axis the point at which the maximum slope of the signal input pulse occurs, as follows: input pulse 10 having a point of maximum slope at the leading edge is first differentiated to produce wave 12 peaked at the reference point, then clipped to preserve the peaked portion of the wave and again differentiated so that the new wave 15 passes through a zero point coinciding with the reference axis; the wave 15 is again clipped and amplified to produce a pulse 19 having a steep wavefront coinciding with the reference axis and finally the pulse 19 after limiting, used to trigger or otherwise effect a pulse reshaping circuit to finally produce a time modulated pulse 23 least effected by noise accompanying the input pulses.

While we have described above the principles of our invention in connection with specific apparatus, it is to be clearly understood that this description is made only by way of example and not as a limitation to the scope of our invention as set forth in the objects thereof and in the accompanying claims.

We claim:

1. A maximum slope pulse detector comprising a source of time modulated unidirectional pulse signals each including a sloping leading and trailing edge, said leading edge having a point of maximum slope, means coupled directly to said source and responsive to said pulse signals to produce a signal wave having undulations of opposite polarities, one of said undulations having a maximum amplitude time coincident with said point of maximum slope, means coupled directly to said signal wave producing means to pass only said one of said undulations, and means coupled directly to said means passing only said one of said undulations responsive to said one of said undulations to produce a pulse having a relatively steep leading edge time coincident with said point of maximum slope.

2. A maximum slope pulse detector comprising a source of time modulated unidirectional pulse signals each including a sloping leading and trailing edge, said leading edge having a point of maximum slope, and means coupled directly to said source and responsive to said pulse signals to produce a signal wave having undulations of opposite polarity, one of said undulations having a maximum amplitude time coincident with said point of maximum slope, means coupled directly to said signal wave producing means to pass only said one of said undulations, means coupled directly to said means passing only said one of said undulations responsive to said one of said undulations to produce a pulse having a relatively steep leading edge time coincident with said point of maximum slope, and means coupled to the output of said steep leading edge pulse producing means for reshaping said steep leading edge pulse to provide a steep wavefront version of said time modulated pulse signals.

3. A maximum slope pulse detector comprising a source of time modulated unidirectional pulse signals each including a sloping leading and trailing edge, said leading edge having a point of maximum slope, a differentiating circuit coupled directly to said source and responsive to said pulse signals to produce a signal wave having undulations of opposite polarity, one of said undulations having a maximum amplitude time coincident with said point of maximum slope, clipping means coupled directly to said differentiating circuit to pass only said one of said undulations, means including a pulse amplifier coupled directly to said clipping means responsive to said one of said undulations to produce a pulse having a relatively steep leading edge time coincident with said point of maximum slope, and means coupled to the output of said steep leading edge pulse producing means for reshaping said steep leading edge pulse to provide a steep leading edge version of said time modulated pulse signals.

4. A maximum slope pulse detector comprising a source of positive time modulated pulse signals each including a sloping leading and trailing edge, said leading edge having a point of maximum slope, a first differentiating circuit connected directly to said source and responsive to said pulse signals to produce a first wave having positive and negative undulations, said positive undulation of said first wave having its point of maximum amplitude at said point of maximum slope, first clipping means connected directly to said first differentiating circuit for passing said positive undulation of said first wave and rejecting said negative undulation of said first wave, a second differentiating circuit connected directly to said first clipping circuit and responsive to said positive undulation of said first wave to produce a second wave having a positive undulation, a negative undulation, and a polarity transition point between said positive and negative undulations time coincident with the point of maximum amplitude of said positive undulation of said first wave and said point of maximum slope of the leading edge of said pulse signals, said positive undulation of said second wave occurring on the rising leading edge of said positive undulation of said first wave and said negative undulation of said second wave occurring during the falling trailing edge of said positive undulation of said first wave, second clipping means connected directly to second differentiating means to pass said negative undulation of said second wave and to reject said positive undulation of said second wave, a pulse amplifier connected directly to the output of said second clipping means and responsive to said negative undulation of said second wave to invert and amplify said negative undulation of said second wave, a limiter circuit connected directly to the output of said amplifier circuit and responsive to the amplified and inverted version of said negative undulation of said second wave to produce a signal wave having a relatively steep leading edge time coincident with said point of maximum slope, and a reshaper connected directly to the output of said limiter and responsive to said steep leading edge signal wave to reshape said steep leading edge signal wave to provide a relatively steep leading edge version of said time modulated pulse signals.

5. A maximum slope pulse detector comprising a source of time modulated pulse signals each having sloping leading and trailing edges and a point of maximum slope, means coupled directly to said source and responsive to said pulse signals to produce a signal wave having a portion peaked at the time of occurrence of said point of maximum slope, means coupled directly to said peaked signal wave producing means to pass only said peaked portion, and means coupled to said means passing only said peaked portion to produce a pulse whose leading edge corresponds in time to said point of maximum slope.

6. A maximum slope pulse detector comprising a source of time modulated pulse signals having sloping leading edges, means coupled directly to said signal source for producing output electrical signal waves having a portion peaked at the time of occurrence of the point of maximum slope of said sloping leading edges, means coupled directly to said peaked signal-producing means to pass only said peaked portion, means coupled directly to said means passing only said peaked portion for producing signal waves having steep wavefronts coinciding in time with said point of maximum slope, and means coupled to the output of said steep wavefronts signal-producing means for reshaping said steep wavefront signal waves to provide a steep wavefront version of said time modulated pulse signals.

7. A maximum slope pulse detector comprising a source of time modulated pulse signals having sloping leading and trailing edges, differentiating circuit means coupled directly to said signal source for producing output electrical signal waves having a portion peaked at the time of occurrence of the point of maximum slope of said pulse signals, clipping means coupled directly to said differentiating circuit means to pass only said peaked portion, means including a pulse amplifier coupled directly to the output of said clipping means for producing signal waves having steep wavefronts coinciding in time with said point of maximum slope, and means coupled directly to the output of said steep wavefront signal-producing means for reshaping said steep wavefront signal waves to provide a steep wavefront version of said time modulated pulse signals.

8. A maximum slope pulse detector comprising a source of time modulated pulse signals having sloping leading and trailing edges, a first differentiating circuit coupled directly to said source of pulse signals for producing a first wave having first and second undulations of opposite polarities, one of said first and second undulations being peaked at the point of maximum slope of the leading edge of each pulse signal, first clipping means coupled directly to said first differentiating circuit for passing said one of said first and second undulations and rejecting the other of said first and second undulations, a second differentiating circuit coupled directly to said clipping circuit for producing a second wave having third and fourth undulations of opposite polarity having a polarity transition point therebetween coinciding with the peak of said one of said first and second undulations and said point of maximum slope, second clipping means coupled directly to said second differentiating means responsive to said second wave to pass one of said third and fourth undulations having its leading edge coincide with said transition point and rejecting the other of said third and fourth undulations having its trailing edge coincide with said transition point, amplifier means coupled directly to said second clipping means for amplifying said one of said third and fourth undulations to produce a signal wave having a steep wavefront coinciding with said point of maximum slope, and means coupled directly to the output of said amplifier means for reshaping said steep wavefront signal waves to provide a steep wavefront version of said time modulated pulse signals.

(References on following page)

References Cited in the file of this patent

UNITED STATES PATENTS

| | | |
|---|---|---|
| 2,266,154 | Blumlein | Dec. 16, 1941 |
| 2,399,135 | Miller et al. | Apr. 23, 1946 |
| 2,408,078 | Labin et al. | Sept. 24, 1946 |
| 2,419,547 | Grieg | Apr. 29, 1947 |
| 2,433,379 | Levy et al. | Dec. 30, 1947 |
| 2,444,438 | Grieg | July 6, 1948 |
| 2,448,718 | Koulicovitch | Sept. 7, 1948 |
| 2,456,818 | Dickinson | Dec. 21, 1948 |
| 2,510,129 | Moore | June 6, 1950 |
| 2,554,994 | Lester | May 29, 1951 |
| 2,820,909 | Plouffe | Jan. 21, 1958 |